United States Patent
Ragan

(10) Patent No.: US 10,456,811 B2
(45) Date of Patent: Oct. 29, 2019

(54) LIM WEIGHT SORTER

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 30 days.

(21) Appl. No.: 15/571,173

(22) PCT Filed: May 24, 2016

(86) PCT No.: PCT/US2016/033940
§ 371 (c)(1),
(2) Date: Nov. 1, 2017

(87) PCT Pub. No.: WO2016/196087
PCT Pub. Date: Dec. 8, 2016

(65) Prior Publication Data
US 2018/0111166 A1    Apr. 26, 2018

Related U.S. Application Data

(60) Provisional application No. 62/171,009, filed on Jun. 4, 2015.

(51) Int. Cl.
*B07C 5/16* (2006.01)
*B07C 5/36* (2006.01)
(Continued)

(52) U.S. Cl.
CPC ............... *B07C 5/16* (2013.01); *B07C 5/36* (2013.01); *B07C 5/38* (2013.01); *B65G 17/24* (2013.01); *B65G 47/53* (2013.01); *B65G 54/02* (2013.01)

(58) Field of Classification Search
CPC ........... B07C 5/16; B07C 5/38; B65G 17/062; B65G 17/064; B65G 17/083; B65G 39/20; B65G 47/54; B65G 54/02; B65G 17/24
See application file for complete search history.

(56) References Cited

U.S. PATENT DOCUMENTS 3,731,782 A      5/1973   Del Rosso
4,781,286 A *   11/1988  Weaver .................. B65G 13/06
                                                         198/619
(Continued)

FOREIGN PATENT DOCUMENTS

EP          1142808 A2    10/2001
EP          1947035 A1     7/2008
(Continued)

OTHER PUBLICATIONS

European Search Report of European Patent Application No. 16804010.3 dated Feb. 1, 2019, European Patent Office, Munich, German.

*Primary Examiner* — Joseph C Rodriguez
(74) *Attorney, Agent, or Firm* — James T. Cranovich

(57) ABSTRACT

A conveyor and a method for weighing conveyed objects or sorting them by weight. The conveyor comprises a conveyor belt having electrically conductive rollers that are rotated with a constant torque in a lateral direction by a linear-induction stator defining a roller-activation zone along a carryway. Because the lateral acceleration of a conveyed object is inversely proportional to the object's weight, lighter objects are displaced laterally farther and at greater speeds than heavier objects. So their weights can be determined from the lateral acceleration, speed, or displacement. And objects can be sorted off the side of the belt by weight.

17 Claims, 5 Drawing Sheets

(51) Int. Cl.
*B65G 47/53* (2006.01)
*B65G 17/24* (2006.01)
*B65G 54/02* (2006.01)
*B07C 5/38* (2006.01)

(56) References Cited

U.S. PATENT DOCUMENTS

| | | | |
|---|---|---|---|
| 6,712,220 B2* | 3/2004 | Ruigrok | B07C 5/38 |
| | | | 209/592 |
| 8,129,635 B2 | 3/2012 | Turner | |
| 8,511,460 B2 | 8/2013 | Ragan et al. | |
| 9,108,807 B1 | 8/2015 | Ogle, II | |
| 9,321,598 B2* | 4/2016 | Araki | B65G 43/10 |
| 9,428,338 B2* | 8/2016 | Ragan | B65G 17/24 |
| 9,624,043 B2* | 4/2017 | Koetje | B65G 47/681 |
| 10,087,013 B2* | 10/2018 | Ragan | B65G 23/04 |
| 2004/0173436 A1 | 9/2004 | Baker | |
| 2008/0023294 A1 | 1/2008 | Moore et al. | |
| 2010/0230245 A1 | 9/2010 | Ragan et al. | |

FOREIGN PATENT DOCUMENTS

| | | | |
|---|---|---|---|
| EP | 2865616 A1 | 4/2015 | |
| JP | 2001240226 A | 9/2001 | |
| JP | 2013106480 A | 5/2013 | |
| WO | 2005007545 A1 | 1/2005 | |
| WO | 2013169343 A1 | 11/2013 | |
| WO | WO-2013169343 A1 * | 11/2013 | B65G 17/24 |

* cited by examiner

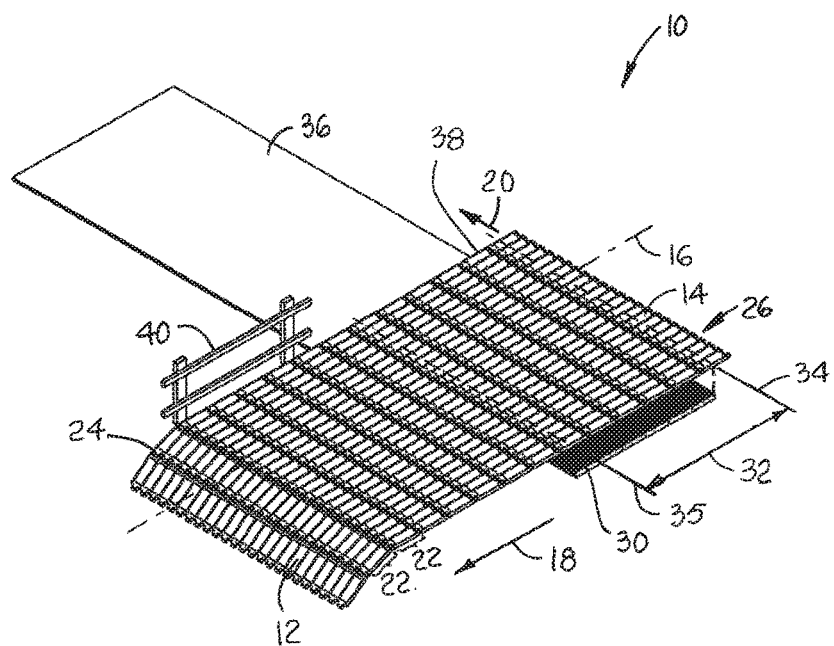
FIG. 1
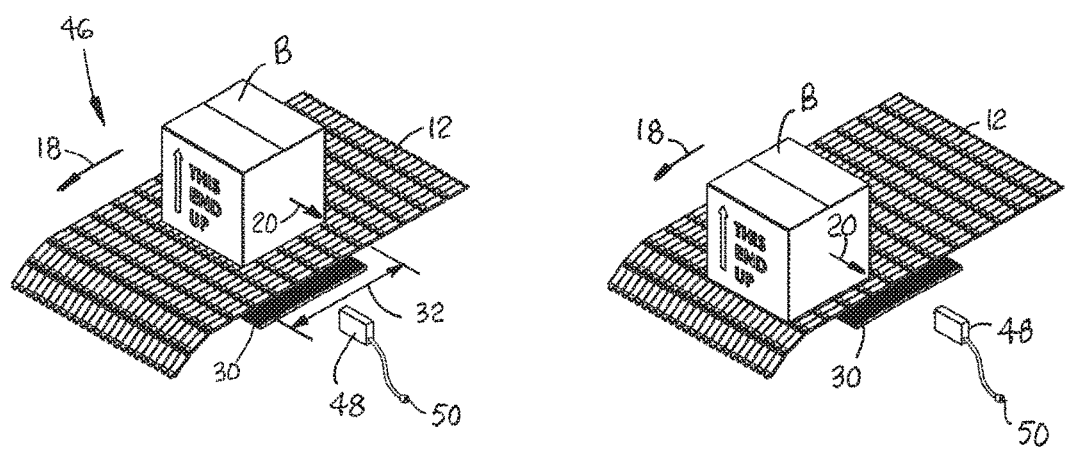
FIG. 6A
FIG. 6B

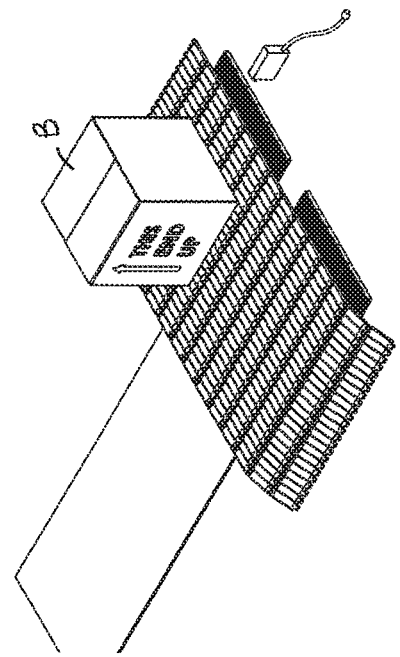
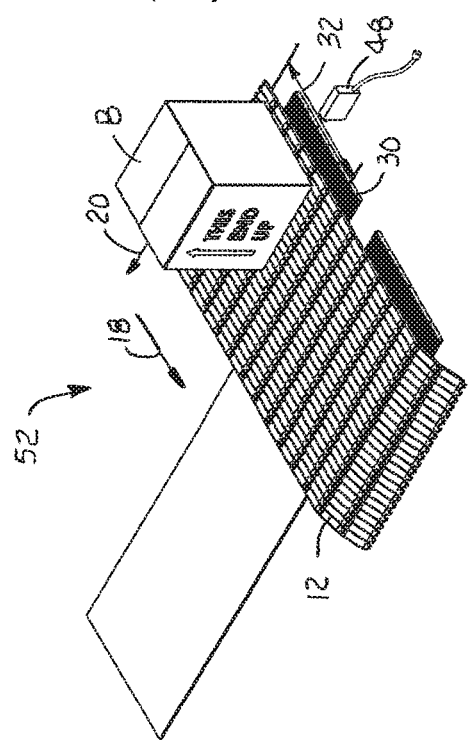
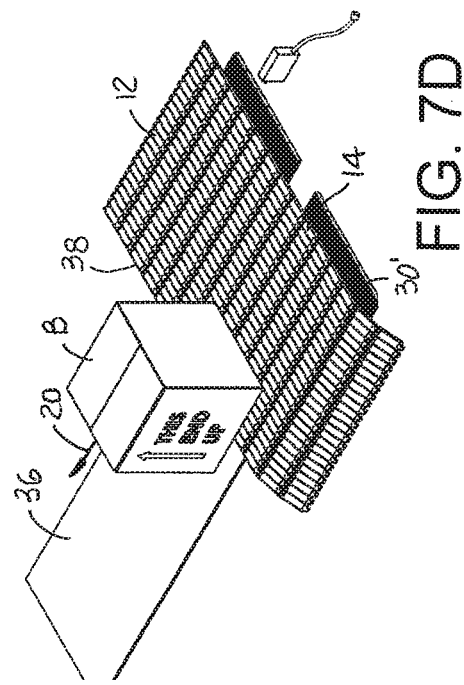
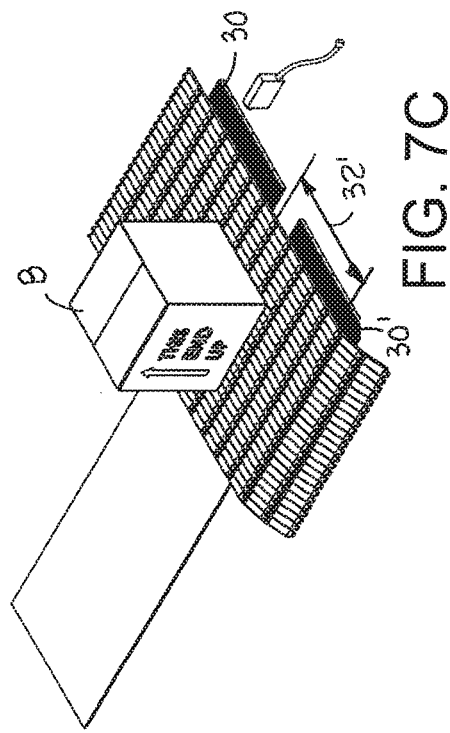

LIM WEIGHT SORTER

BACKGROUND

The invention relates generally to power-driven conveyors and more particularly to conveyor belts with electromagnetically activated, article-supporting rollers diverting conveyed articles from the main conveying direction.

Many production operations use weight measurements for quality control. For example, a beverage-packing facility may weigh packed cases of multiple cans to ensure that cases with leaking or improperly filled cans are rejected and removed from the production line. Checkweighers consisting of a section of conveyor belt on a weigh scale are often used to weigh cases. Positioned in the production line, the checkweigher can weigh only one case at a time. Consecutive cases have to be separated by a gap or stopped from entering the checkweigher belt when another case is being weighed. And many checkweighers require the cases to be stopped for an accurate measurement. Starting and stopping the conveyors and gapping cases slows production.

SUMMARY

One version of a conveyor embodying features of the inventions comprises a conveyor belt advancing along a carryway path in a direction of belt travel. The conveyor belt has rollers that are rotatable in a lateral direction transverse to the direction of belt travel. A linear stator is situated adjacent to the conveyor belt in a roller-activation zone that extends along the carryway path from a zone entrance to a zone exit. Each of the rollers, acting as a rotor, forms with the linear stator a constant-torque linear-induction motor that rotates the rollers in the lateral direction in the roller-activation zone. Objects conveyed on the conveyor belt are propelled by the rotation of the rollers to exit the roller-activation zone with a speed parallel to the lateral direction that is inversely proportional to the weights of the objects.

Another version of a conveyor embodying features of the invention comprises a conveyor belt advancing along a carryway path in a direction of belt travel. The conveyor belt has rollers that are rotatable in a lateral direction transverse to the direction of belt travel. A linear-motor stator is situated adjacent to the conveyor belt and produces a traveling electromagnetic flux wave that travels in a direction transverse to the direction of belt travel along the conveyor belt in a roller-activation zone that extends along the carryway path from a zone entrance to a zone exit. The rollers include electrically conductive material in which eddy currents are induced by the traveling magnetic flux wave as the rollers pass through the roller-activation zone. The eddy currents produce a reaction electromagnetic field that interacts with the traveling magnetic flux wave to produce a torque in the rollers that causes them to rotate in the lateral direction. The torque is constant enough to cause the rollers in the roller-activation zone to accelerate with a constant enough angular acceleration to move objects conveyed on the belt parallel to the lateral direction. The lateral accelerations, speeds, and displacements of the conveyed objects are inversely proportional to the conveyed objects' weights.

In another aspect of the invention a method embodying features of the invention for conveying objects comprises: (a) conveying objects atop rollers on a conveyor belt advancing in a direction of belt travel; and (b) activating the rollers passing through a roller-activation zone by linear induction to rotate in a direction transverse to the direction of belt travel to cause each object to move along a trajectory that depends on the object's weight.

BRIEF DESCRIPTION OF THE DRAWINGS

FIG. 1 is an isometric view of a portion of a sorter embodying features of the invention;

FIGS. 6A and 6B depict two sequential isometric views of the sorter of FIG. 1 with a sensor used to measure lateral displacement of a conveyed article; and FIGS. 7A-7D depict sequential isometric views of a sorter as in FIG. 1 with multiple roller-actuation zones.

DETAILED DESCRIPTION

Figure 2A:
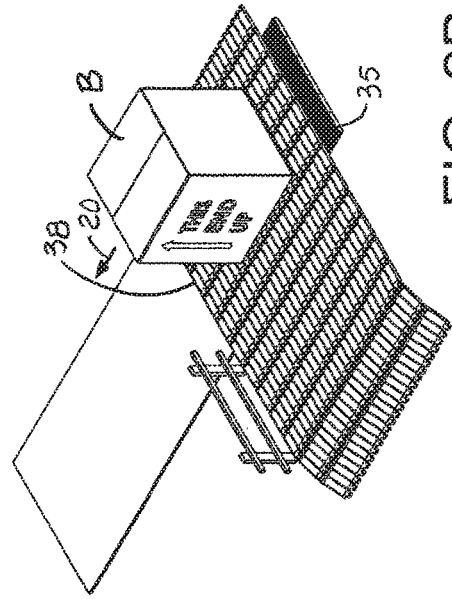
FIGS. 2A-2D depict the sequence of diverting or conforming articles to a side of the sorter of FIG. 1.

A portion of a weighing and sorting conveyor embodying features of the invention is shown in FIG. 1. The conveyor 10 comprises a conveyor belt 12 having rows of rollers 14 rotatable on axes of rotation 16. In this example the axes of rotation 16 are parallel to a direction of belt travel 18 so that the rollers 14, at their apexes, rotate in a lateral direction 20 perpendicular to the direction of belt travel 18. The rollers could alternatively be arranged with their axes oblique to the direction of belt travel 18. In that case the rollers would rotate in a direction transverse, although not perpendicular, to the direction of belt travel 18. In the rest of this description, the rollers 14 are shown rotating in a lateral direction 20 perpendicular to the direction of belt travel.

The exemplary conveyor belt 12 shown in FIG. 1 is a modular plastic conveyor belt constructed of rows 22 of belt modules linked together at hinge joints 24 and driven continuously by motor-driven drive sprockets or drums (not shown) in the direction of belt travel 18 along an upper carryway path 26. The rollers 14 are cylindrical rollers that are made of an electrically conductive material, such as aluminum or copper, or that contain elements made of such a material. For a better grip on conveyed objects, the rollers 14 have a high-friction outer surface, textured or coated with a high-friction material such as rubber, an elastomer, or other resilient material.

A linear-motor stator 30 is situated proximate the conveyor belt 14 along a portion of the carryway 26. In this example the stator 30 lies under the conveyor belt 14 along a portion of the carryway 26 between the carryway and a lower returnway (not shown). The stator 30 is arranged to produce an electromagnetic flux wave that travels across the stator perpendicular to the axes 16 of the rollers 14 and across the width of the conveyor belt 12 in that portion of the belt directly above the stator. The traveling flux wave induces eddy currents in the electrically conductive material of the rollers 14. The currents produce a reaction magnetic field that interacts with the stator flux wave to cause a constant torque in the rollers 14, which act as rotors to the stator 30 in a linear-induction motor, or LIM. The torque causes the rollers to rotate in the lateral direction 20 at their apexes. The dimensions of the stator 30 define the extent of a roller-activation zone 32 that extends across the width of the carryway 26 from an entrance end 34 of the zone to an exit end 35 downstream. The sorting conveyor also includes a side-off conveyor 36 such as a belt conveyor, a roller conveyor, or a chute, receiving objects diverted off a side 38 of the belt 12 by the rollers 14 activated as they pass through the roller-activation zone 32. A side rail 40 downstream of the side-off conveyor 36 prevents objects from exiting the side 38 of the belt 12 immediately downstream of the side-off conveyor 36.

Figure 2B:
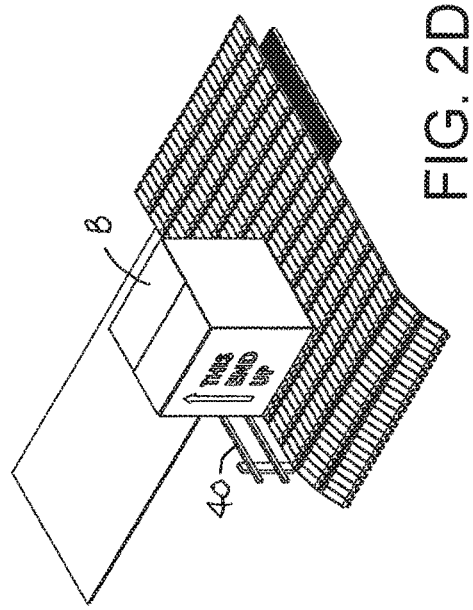
Figure 2C:
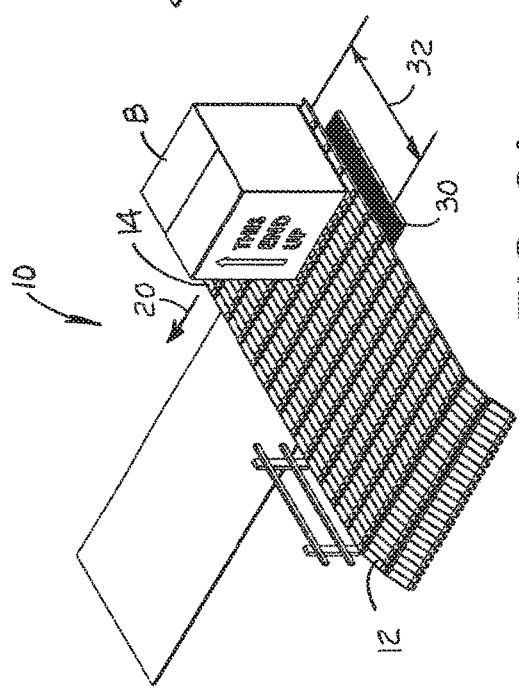
Figure 2D:
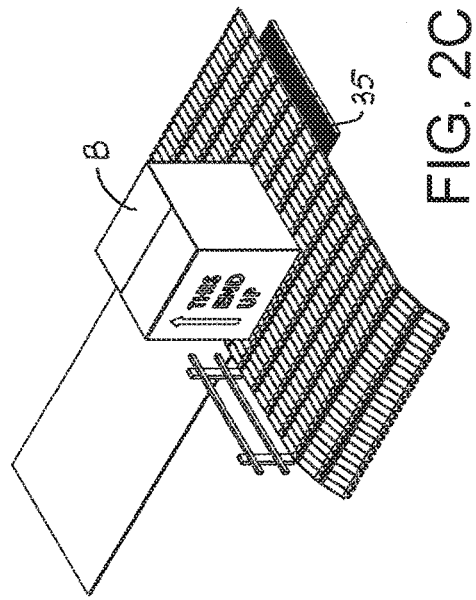
Figure 3A:
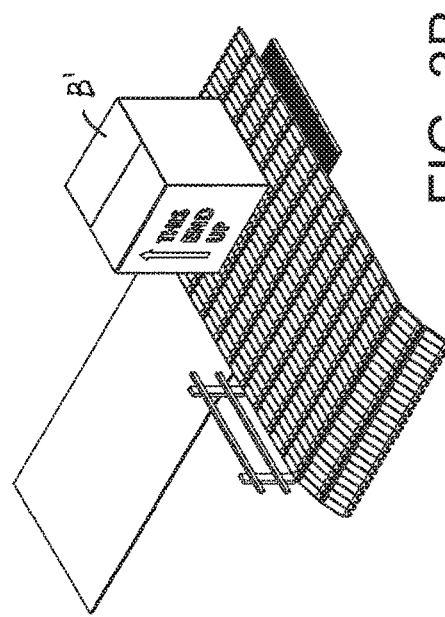
FIGS. 3A-3D depict the sequence of diverting a lighter, non-conforming article off a side of the sorter of FIG. 1.
Figure 3B:
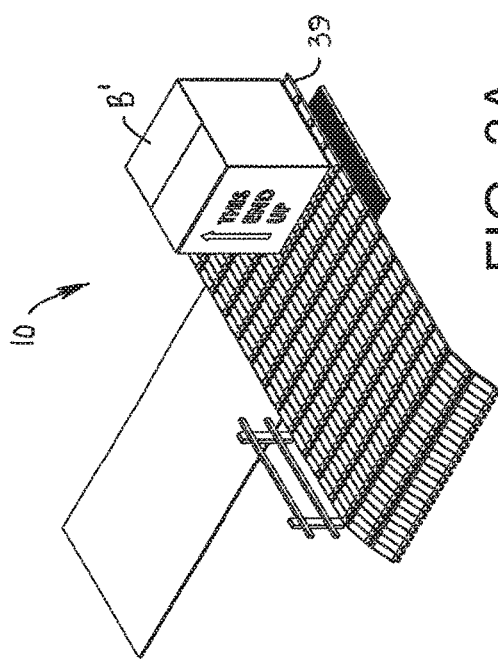
Figure 3C:
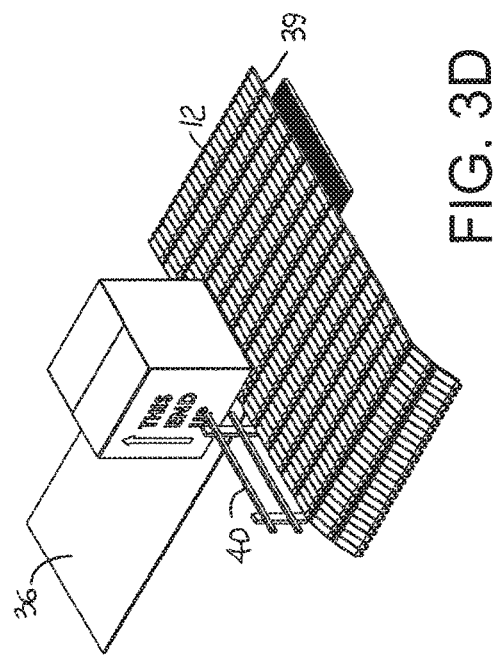
Figure 3D:
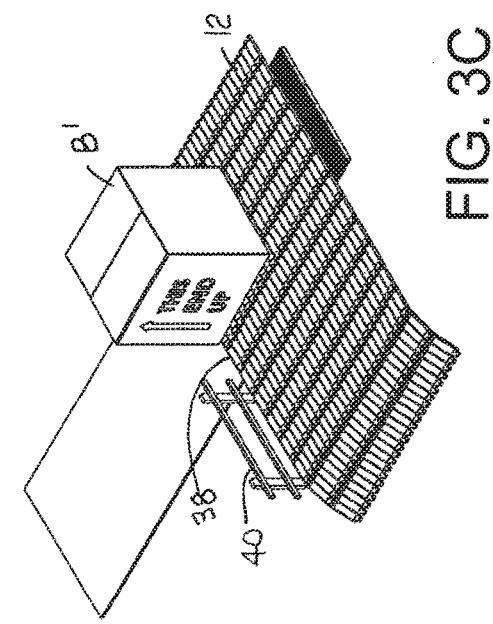

The operation of the LIM-activated sorter 10 in a weight-based quality control conveyor system is shown in FIGS. 2A-2D. In FIG. 2A an object, in this example a filled box B, is shown entering the roller-activation zone 32 above the linear-motor stator 30. The rollers 14 passing through the activation zone 32 on the conveyor belt 12 are rotated in the lateral direction 20 by the stator's flux wave. Because the torque of the rollers 14 generated by the LIM stator 30 is generally constant, the acceleration of the rollers is also constant and inversely proportional to the weight of the box B atop the rollers 14. The rollers 14 rotate faster and faster as they proceed with the belt 12 through the activation zone 32. The rollers 14 accelerate the box B in the lateral direction 20 through the roller activation zone and push it toward the side 38 as shown in FIG. 2B. Upon exiting the roller-activation zone 32, the rollers supporting the box B reach a final speed $v_f$ at which they continue to coast, without further acceleration, downstream of the exit end 35 of the zone, as shown in FIG. 2C, until the box contacts the side rail 40 in FIG. 2D. So the rate of lateral displacement of the box B increases in the roller activation zone 32 and remains constant downstream where the rollers 14, no longer activated, are allowed to coast.

FIGS. 3A-3D depict the operation of the weight sorter 10 with a non-conforming underweight box B'. The motion of the underweight box B' in FIGS. 3A-3D differs from that of the heavier box B in FIGS. 2A-2D in that it travels faster laterally. That's because the acceleration of the rollers and the lateral acceleration of the box are inversely proportional to the box's weight. So the lighter box B' reaches the side 38 of the belt 12 at a position upstream of where the heavier box B in FIG. 2D reaches the side rail 40. The side-off conveyor 36 upstream of the rail 40 receives the rejected underweight box B' sorted off the belt 12. In the sorters shown in FIGS. 2A-D and 3A-D, the boxes B, B' would normally enter activation zone 32 at a specific lateral position, such as registered along the side 39 of the belt 12 opposite the side-off conveyor 36.

Figure 4:
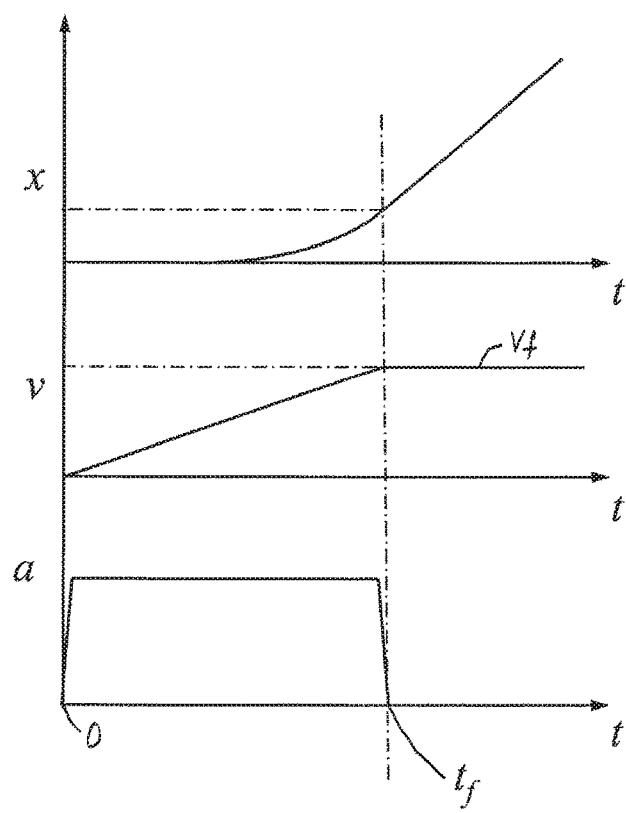
FIG. 4 depicts graphs of the acceleration, velocity, and lateral displacement as a function of time for a conveyed article on the sorter of FIG. 1.

Graphs of the equations of motion of objects conveyed atop the rollers are shown in FIG. 4. The time $t_f$ represents the time, measured from time t=0, during which the object is passing through the roller-actuation zone. That time period $t_f$ depends on the speed of the conveyor belt and the length of the activation zone along the carryway. In that time $t_f$, the object is subjected to a constant acceleration a, as indicated by the bottom graph. The amplitude of the acceleration a is inversely proportional to the object's weight. During that time the lateral speed v of the object and of the rollers supporting the object increases linearly with time t, as shown by the middle graph. The lateral displacement x of the object increases with the square of the time variable t. Once the object exits the end of the roller-actuation zone, i.e., for $t > t_f$, the acceleration drops to zero and the object coasts laterally at a constant speed $v_f$. The object's lateral displacement x downstream of the roller-actuation zone increases linearly with time t. The graphs of FIG. 4 depict the ideal case in which the torque is constant on all the loaded rollers, the friction of the roller bearings is insignificant, and the objects don't slip on the outer surfaces of the rollers.

Because the acceleration of a heavier object is less than that of a lighter object, the speed $v_f$ the object reaches upon exiting the roller-actuation zone is less for the heavier object. And like the acceleration, that speed $v_f$ is inversely proportional to the object's weight. Likewise, the lateral displacement x is inversely proportional to the object's weight and so a lighter object travels a greater lateral distance in the same time as a heavier object. So the weight of an object can be determined from its final speed $v_f$, its displacement x, or its acceleration a.

Figure 5:
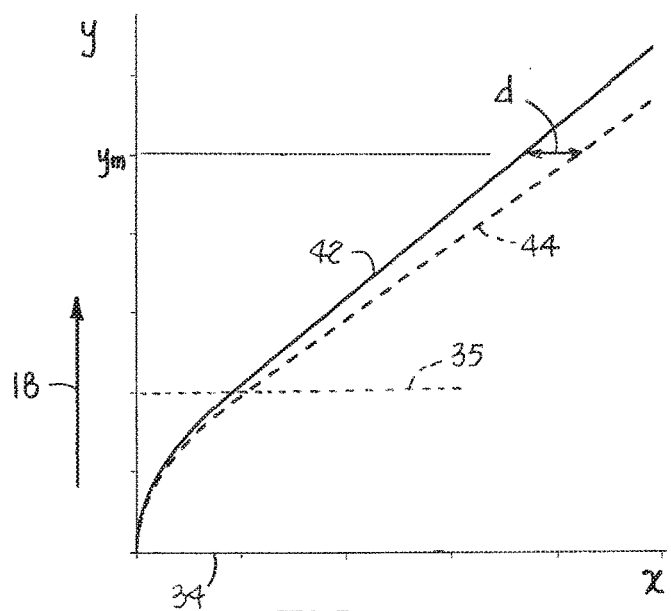
FIG. 5 is a plot of the trajectories of light and heavy articles conveyed on a sorter as in FIG. 1.

The trajectories of heavy and light objects along the carryway of a conveyor as in FIGS. 1-3 is shown in FIG. 5, which is an overhead view of the trajectories of objects on a conveyor belt advancing in the direction of belt travel 18. Lateral displacement is given by the horizontal axis x; displacement in the direction of belt travel is given by the vertical axis y. The belt is considered to advance in the direction of belt travel at a constant speed. The roller-activation zone's entrance end 34 coincides with the x axis. The exit end 35 is indicated by the dashed line. The solid-line trajectory 42 represents the trajectory of a heavy object. The dashed-line trajectory 44 represents the trajectory of a light object. The horizontal distance d between the two trajectories 42, 44, representing the difference between their lateral displacements x, at a given distance $y_m$ from the entrance end 34 of the roller-actuation zone is a measure of the difference in the weights of the heavy and light objects. In the roller-activation zone the objects follow a parabolic trajectory, for which $x \propto y^2$. Downstream of the roller-activation zone, the trajectories are linear and $x \propto y$. Because the trajectories show the lateral displacement x at any measurement position $y_m$ along the carryway path, the weight of an object can be determined from its trajectory.

FIGS. 6A and 6B show a non-stop checkweigher 46 comprising a stator 30 forming a roller-activation zone 32 through which a roller-top conveyor belt 12 advances continuously. A sensor 48, such as a laser range finder or any sensor system whose output can be used to determine the lateral displacement, lateral speed, or lateral acceleration of a box B, is shown positioned at the side of the conveyor belt 12. The stator 30 causes the rollers to rotate and push the box B in the lateral direction 20 as the conveyor belt 12 advances in the direction of belt travel 18 through the roller-activation zone 32. From the box's lateral motion as it advances through the roller-activation zone 32, the output 50 of the sensor 48 can be used to determine the box's weight from its lateral acceleration, speed, or displacement in moving from one side of the belt 12 to the other as shown by the progression from FIG. 6A to FIG. 6B.

The weighing and sorting functions can be combined as shown in the system of FIGS. 7A-7D. The weighing and sorting system 52 uses a first stator 30 in an upstream roller-activation zone 32 with a sensor 48, as in FIGS. 6A-6B, to determine the weight of the box B and move it in the lateral direction 20 as the conveyor belt 12 advances in the direction of belt travel 18. The weighing function is shown in the sequence from FIG. 7A to FIG. 7B. In FIGS. 7C and 7D the box is sorted off the side 38 of the belt 12 in the lateral direction 20 and onto a discharge conveyor 36 by activated belt rollers 14 passing through a downstream roller-activation zone 32' formed by a downstream stator 30'. Heavier boxes not moved far enough in the lateral direction 20 to be sorted off onto the discharge conveyor 36 would continue down the conveying line for further processing.

Although the invention has been described in detail with respect to a few preferred versions, other versions are possible. For example, the sensor used could be a visioning system that computes the objects' weights from the lateral acceleration, speed, or displacement derived from the objects' trajectories. In all the versions described, the conveyed objects ride directly on belt rollers that include electrically conductive material to act as the rotors of linear-induction motors. But the electrically conductive belt rollers do not have to contact the conveyed objects directly. Instead, the electrically conductive rollers could be used to drive one or more object-supporting belt rollers to move the objects laterally across the belt. And a series of roller-activation zones formed by a series of stators along the carryway could be used to sort objects of different weights off the side of the belt at a number of discharge points at spaced apart positions along the carryway with the lighter objects sorted off upstream of the heavier objects. So, as these few examples suggest, the scope of claims is not meant to be limited to the details of the exemplary versions used to describe the invention.

What is claimed is:

1. A conveyor comprising:
a conveyor belt advancing along a carryway path in a direction of belt travel, the conveyor belt having a plurality of electrically conductive rollers rotatable in a lateral direction transverse to the direction of belt travel;
a linear stator adjacent to the conveyor belt in a roller-activation zone extending along the carryway path from a zone entrance to a zone exit;
wherein each of the electrically conductive rollers, acting as a rotor, forms with the linear stator a constant-torque linear-induction motor that rotates the rollers in the lateral direction in the roller-activation zone so that objects conveyed on the conveyor belt are propelled by the rotation of the rollers to exit the roller-activation zone with a speed parallel to the lateral direction that is inversely proportional to the weights of the objects;
a sensor sensing the conveyed objects and making measurements of their lateral acceleration, lateral speed, or lateral displacement along the carryway downstream of the zone entrance of the roller-activation zone for conversion of the measurements into object weights.

2. A conveyor as in claim 1 wherein the rollers are deactivated and allowed to coast upon exiting the roller-activation zone.

3. A conveyor as in claim 1 further comprising one or more discharge points at spaced apart positions along the carryway at which objects transfer off a side of the conveyor, wherein the objects are sorted according to their weights.

4. A conveyor as in claim 3 comprising two or more discharge points and wherein the lighter objects are sorted off upstream of the heavier objects.

5. A conveyor as in claim 3 wherein the lateral displacements of the heaviest objects on the carryway are not great enough to transfer the heaviest objects off the side of the conveyor.

6. A conveyor as in claim 1 comprising a series of linear stators defining a series of roller-activation zones along the carryway.

7. A conveyor as in claim 1 wherein the rollers are in direct contact with the conveyed objects.

8. A conveyor as in claim 1 wherein the conveyor belt further has object-supporting rollers rotated by the rotating rollers.

9. A conveyor as in claim 1 wherein the lateral direction is perpendicular to the direction of belt travel.

10. A conveyor comprising:
a conveyor belt advancing along a carryway path extending from an upstream end to a downstream end in a direction of belt travel, the conveyor belt having a plurality of rollers rotatable in a lateral direction transverse to the direction of belt travel;
a linear-motor stator adjacent to the conveyor belt and producing a traveling electromagnetic flux wave that travels in a direction transverse to the direction of belt travel along the conveyor belt in a roller-activation zone extending along the carryway path from a zone entrance to a zone exit;
wherein the rollers include electrically conductive material in which eddy currents are induced by the traveling magnetic flux wave as the rollers pass through the roller activation zone, the eddy currents producing a reaction electromagnetic field that interacts with the traveling magnetic flux wave to produce a torque in the rollers that causes them to rotate in the lateral direction;
wherein the torque is constant enough to cause the rollers in the roller-activation zone to accelerate with a constant enough angular acceleration to move objects conveyed on the belt parallel to the lateral direction and wherein the lateral accelerations, speeds, and displacements of the conveyed objects are inversely proportional to the conveyed objects' weights;
one or more discharge points at spaced apart positions along the carryway at which objects transfer off a side of the conveyor belt, wherein the spaced apart positions are predetermined by the trajectories of objects of different weights so that lighter objects are transferred off at discharge points upstream of discharge points at which heavier objects are transferred off;
a sensor measuring the lateral displacements of the conveyed objects at a predetermined position along the carryway downstream of the zone entrance of the roller-activation zone for conversion of the lateral accelerations, speeds, or displacements into object weights.

11. A conveyor as in claim 10 wherein the rollers rotate in the lateral direction at a constant speed upon exiting the roller-actuation zone.

12. A conveyor as in claim 10 wherein the lateral displacements of the heaviest objects on the carryway path are not great enough to transfer the heaviest objects off the side of the conveyor.

13. A conveyor as in claim 10 comprising a series of linear-motor stators defining a series of roller-activation zones along the carryway.

14. A conveyor as in claim 10 wherein the conveyor belt further has object-supporting rollers driven by the rotating rollers.

15. A method for conveying objects, comprising:
conveying objects atop electrically conductive rollers on a conveyor belt advancing in a direction of belt travel;
activating the electrically conductive rollers passing through a roller-activation zone by linear induction to rotate in a direction transverse to the direction of belt travel to cause each object to move along a trajectory that depends on the object's weight;
sensing the objects atop the rollers to make measurements of the objects' lateral acceleration, lateral speed, or lateral displacement; and
determining the weights of the objects from the measurements.

16. The method of claim 15 further comprising determining the weight of each object from its trajectory.

17. The method of claim 15 further comprising sorting objects off a side of the conveyor belt by weight with lighter objects sorted off upstream of heavier objects.

\* \* \* \* \*